(12) United States Patent
Discekici et al.

(10) Patent No.: US 12,179,423 B2
(45) Date of Patent: Dec. 31, 2024

(54) THREE-DIMENSIONAL PRINTING WITH CHEMICAL FUNCTIONALIZATION AGENTS (71) Applicant: HEWLETT-PACKARD DEVELOPMENT COMPANY, L.P., Spring, TX (US)

(72) Inventors: Emre Hiro Discekici, San Diego, CA (US); Graciela Emma Negri Jimenez, San Diego, CA (US); Shannon Reuben Woodruff, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 227 days.

(21) Appl. No.: 17/777,776

(22) PCT Filed: Dec. 11, 2019

(86) PCT No.: PCT/US2019/065604
§ 371 (c)(1),
(2) Date: May 18, 2022

(87) PCT Pub. No.: WO2021/118547
PCT Pub. Date: Jun. 17, 2021

(65) Prior Publication Data
US 2023/0035432 A1 Feb. 2, 2023

(51) Int. Cl.
*B29C 64/165* (2017.01)
*B33Y 10/00* (2015.01)
(Continued)

(52) U.S. Cl.
CPC ............ *B29C 64/165* (2017.08); *B33Y 10/00* (2014.12); *B33Y 70/00* (2014.12); *C09D 11/54* (2013.01);
(Continued)

(58) Field of Classification Search
CPC ....... B29C 64/165; B33Y 10/00; B33Y 70/00; B33Y 70/10; C09D 11/54; C08F 73/0206; B29K 2077/00
(Continued)

(56) References Cited

U.S. PATENT DOCUMENTS 7,795,349 B2 9/2010 Bredt et al.
8,163,075 B2 4/2012 Kennedy et al.
(Continued)

FOREIGN PATENT DOCUMENTS

EP 2001656 A2 12/2008
WO 2017/014785 A1 1/2017
(Continued)

OTHER PUBLICATIONS

Jaidev, L.R. et al., "Surface functionalization of 3D printed polymer scaffolds to augment stem cell response," Jan. 5, 2019, Materials and Design, vol. 161, pp. 44-54.
(Continued)

*Primary Examiner* — Galen H Hauth
*Assistant Examiner* — Lawrence D. Hohenbrink, Jr.
(74) *Attorney, Agent, or Firm* — HP Inc. Patent Department (57) ABSTRACT

The present disclosure describes multi-fluid kits for three-dimensional printing, three-dimensional printing kits, and methods of making three-dimensional printed objects. In one example, a multi-fluid kit for three-dimensional printing can include a fusing agent and a chemical functionalization agent. The fusing agent can include water and an electromagnetic radiation absorber. The electromagnetic radiation absorber can absorb radiation energy and convert the radiation energy to heat. The chemical functionalization agent can include water and an amine-containing polymer. The amine-containing polymer can be a branched or unbranched
(Continued)

polymer that includes a polymer backbone and multiple pendant side chains. The individual side chains can include —NH$_2$, —NH—, or a combination thereof.

11 Claims, 4 Drawing Sheets

(51) Int. Cl.
*B33Y 70/00* (2020.01)
*C09D 11/54* (2014.01)
*B29K 77/00* (2006.01)
*B33Y 70/10* (2020.01)
*C08G 73/02* (2006.01)

(52) U.S. Cl.
CPC ........... *B29K 2077/00* (2013.01); *B33Y 70/10* (2020.01); *C08G 73/0206* (2013.01)

(58) Field of Classification Search
USPC ........................................................ 264/494
See application file for complete search history.

(56) References Cited

U.S. PATENT DOCUMENTS

| | | |
|---|---|---|
| 8,529,049 B2 | 9/2013 | De Voeght et al. |
| 8,979,256 B2 | 3/2015 | Verdonck |
| 2018/0126631 A1 | 5/2018 | Nauka et al. |
| 2018/0272607 A1* | 9/2018 | Chaffins ............... B28B 1/001 |
| 2018/0354191 A1* | 12/2018 | Nauka ................ B29C 64/264 |

FOREIGN PATENT DOCUMENTS

| | | |
|---|---|---|
| WO | 2017/069752 A1 | 4/2017 |
| WO | 2019/094008 A1 | 5/2019 |
| WO | 2019/182627 A1 | 9/2019 |

OTHER PUBLICATIONS

Rajaram, A., et al., "Use of the polycation polyethyleneimine to improve the physical properties of alginate-hyaluronic acid hydrogel during fabrication of tissue repair scaffolds," Mar. 2015, Journal of Biomaterials Science, pp. 1-13.

* cited by examiner

THREE-DIMENSIONAL PRINTING WITH CHEMICAL FUNCTIONALIZATION AGENTS

BACKGROUND

Methods of three-dimensional (three-dimensional) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensional print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

The present disclosure describes multi-fluid kits for three-dimensional printing, three-dimensional printing kits, and methods of making three-dimensional printed objects using a chemical functionalization agent. The chemical functionalization agent can include an amine-containing polymer, which can be incorporated into the three-dimensional printed objects to make areas of the surface of the surface of the three-dimensional printed objects functionalized with —$NH_2$ groups, —NH— groups, or a combination thereof. In one example, a multi-fluid kit for three-dimensional printing includes a fusing agent and a chemical functionalization agent. The fusing agent includes water and an electromagnetic radiation absorber. The electromagnetic radiation absorber absorbs radiation energy and converts the radiation energy to heat. The chemical functionalization agent includes water and an amine-containing polymer. The amine-containing polymer is a branched or unbranched polymer including a polymer backbone and multiple pendant side chains, wherein individual side chains include —$NH_2$, —NH—, or a combination thereof. In some examples, the amine-containing polymer can have a weight average molecular weight from about 100 Mw to about 10,000 Mw. In other examples, the amine-containing polymer can be polyethyleneimine or poly(2-aminoethyl methacrylate). In further examples, the amine-containing polymer can be present in an amount from about 5 wt % to about 20 wt % with respect to the total weight of the chemical functionalization agent. In still further examples, the chemical functionalization agent can also include from about 2 wt % to about 10 wt % organic co-solvent based on a total weight of the chemical functionalization agent. In certain examples, the multi-fluid kit can also include a post-processing agent including an amine-reactive compound to react with the —$NH_2$ or —NH— of the amine-containing polymer. In some examples, the amine-reactive compound can be a dye precursor to covalently attach to the —$NH_2$ or —NH— to form a colored dye.

The present disclosure also describes three-dimensional printing kits. In one example, a three-dimensional printing kit includes a powder bed material, a fusing agent to selectively apply to the powder bed material, and a chemical functionalization agent to selectively apply to the powder bed material. The powder bed material includes polymer particles. The fusing agent includes water and an electromagnetic radiation absorber, wherein the electromagnetic radiation absorber absorbs radiation energy and converts the radiation energy to heat. The chemical functionalization agent includes water and an amine-containing polymer, wherein the amine-containing polymer is a branched or unbranched polymer including a polymer backbone having multiple pendant side chains, wherein individual side chains include —$NH_2$, —NH—, or a combination thereof. In some examples, the amine-containing polymer can be polyethyleneimine or poly(2-aminoethyl methacrylate). In further examples, the chemical functionalization agent can include from about 5 wt % to about 20 wt % of the amine-containing polymer, and from about 2 wt % to about 10 wt % organic co-solvent. In other examples, the three-dimensional printing kit can also include a post-processing agent including an amine-reactive compound to react with the —$NH_2$ or —NH— of the amine-containing polymer.

The present disclosure also describes methods of making three-dimensional printed objects. In one example, a method of making a three-dimensional printed object includes iteratively applying individual build material layers of polymer particles to a powder bed. A fusing agent is selectively applied onto the individual build material layers, based on a three-dimensional object model, wherein the fusing agent includes water and an electromagnetic radiation absorber. A chemical functionalization agent is also selectively applied onto the individual build material layers based on the three-dimensional object model. The chemical functionalization agent includes water and an amine-containing polymer, wherein the amine-containing polymer is a branched or unbranched polymer including a polymer backbone having multiple pendant side chains, wherein individual side chains include —$NH_2$, —NH—, or a combination thereof. The powder bed can be exposed to energy to selectively fuse the polymer particles in contact with the electromagnetic radiation absorber to form fused polymer matrix layers from individual build material layers to thereby form the three-dimensional printed object. In some examples, the three-dimensional printed object can include a first surface portion including —$NH_2$, —NH—, or a combination thereof and a second surface portion without the —$NH_2$, —NH—, or a combination thereof. In further examples, the method can also include applying a post-processing agent including an amine-reactive compound to the three-dimensional printed object such that the amine-reactive compound attaches to the —$NH_2$, —NH—, or a combination thereof in the first surface portion. In certain examples, the amine-reactive compound can be a dye precursor that covalently attaches to the —$NH_2$, —NH—, or a combination thereof to form a colored dye, such that the first surface portion becomes colored while the second surface portion remains uncolored.

It is noted that when discussing the multi-fluid kits, three-dimensional printing kits, and methods herein, these discussions can be considered applicable to one another whether or not they are explicitly discussed in the context of that example. Thus, for example, when discussing a fusing agent related to a three-dimensional printing kit, such disclosure is also relevant to and directly supported in the context of multi-fluid kits and methods, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Multi-Fluid Kits for Three-Dimensional Printing

The multi-fluid kits, three-dimensional printing kits, and methods described herein can be used to make three-dimensional printed objects that have chemically functionalized surfaces. Specifically, an amine-containing polymer such as polyethyleneimine can be integrated into the three-dimensional printed object at specific locations to form any desired pattern of chemically functionalized areas on the three-dimensional printed object. The chemically functionalized areas can have amine groups available for reaction. Thus, any amine-reactive compounds can interact with the chemically functionalized surface.

Many of the polymer build materials used in three-dimensional printing are quite chemically inert, which can make it difficult to chemically modify three-dimensional printed objects after printing. Altering the polymeric build materials to include reactive functional groups is one possible way to address this. However, altering polymeric build material can often create new issues in three-dimensional printing processes, and a large expenditure of time and resources can be consumed when adjusting the three-dimensional printing processes to accommodate new polymeric build materials.

To avoid these issues, the materials and methods described herein can be used with a variety of existing polymeric build materials without modifying the polymeric build materials themselves. The chemical functionalization described herein is not provided by modifying the polymeric build material, but rather by using a chemical functionalization agent during the three-dimensional printing process. In many examples, the fluid agents and materials described herein can be used with certain three-dimensional printing processes that involve fusing layers of polymer powder to form solid layers of a three-dimensional printed object. In one process, a fusing agent can be applied onto a powder bed of polymer particles. The fusing agent can include an electromagnetic radiation absorber, which can be a material that absorbs radiant energy and converts the energy to heat. Radiant energy can be applied to the powder bed to heat and fuse the polymer particles on which the fusing agent was applied. In certain examples, the fusing agent can be applied using jetting architecture such as an inkjet print head. Such a system can jet small droplets of the fusing agent at selected locations on the powder bed with a high resolution. This can allow for making high resolution, detailed three-dimensional printed objects.

The chemical functionalization agents containing amine-containing polymers can also be applied to the powder bed during the three-dimensional printing process. This agent can also be jetted using an inkjet print head, in some examples. Using this process, detailed patterns of chemically functionalized areas can be formed with high resolution. For example, the chemical functionalization agent can be applied at or near portions of the powder bed where a surface of the three-dimensional printed object is formed. When the three-dimensional printed object is complete, the amine-containing polymer from the chemical functionalization agent can be incorporated into the fused polymer at the surface of the object. The amine groups in these areas of the surface can be available for reaction with any amine-reactive compounds.

In certain examples, the chemical functionalization agent can be applied to the powder bed around the edges of individual layers or slices of the three-dimensional printed object. These edges will become the surfaces of the final three-dimensional printed object. In further examples, the chemical functionalization agent can also be applied slightly inside the edges (i.e., a few millimeters or less) so that the reactive amine groups can be present slightly beneath the surface of the final three-dimensional printed object. In still further examples, the chemical functionalization agent can be applied slightly outside the edges of the individual layers of the three-dimensional printed object to ensure that the polymer particles present at the surface of the three-dimensional printed object are coated or partially coated with a sufficient amount of the amine-containing polymer.

In certain examples, a post-processing agent can be applied to the three-dimensional printed object. The post-processing agent can include an amine-reactive compound that can react with the amine groups on the chemically functionalized surfaces of the object. A variety of amine-reactive compounds can be used in this way. Some such compounds can attach to the surface in the chemically functionalized areas. For example, some dye precursor molecules can bond to the amine groups to form colored dye molecules that are covalently attached to the surface of the three-dimensional printed object. This type of dye attachment can be used to make detailed patterns on the surface of the three-dimensional printed object that can be colored after printing by dipping in a dye precursor solution. In other examples, the amine groups on the chemically functionalized surface can be used to attach other molecules, such as alkyl halides, epoxides, esters, carboxylic acids, aldehydes, ketones, acid halides, isocyanates, protein molecules, and so on.

Figure 1:
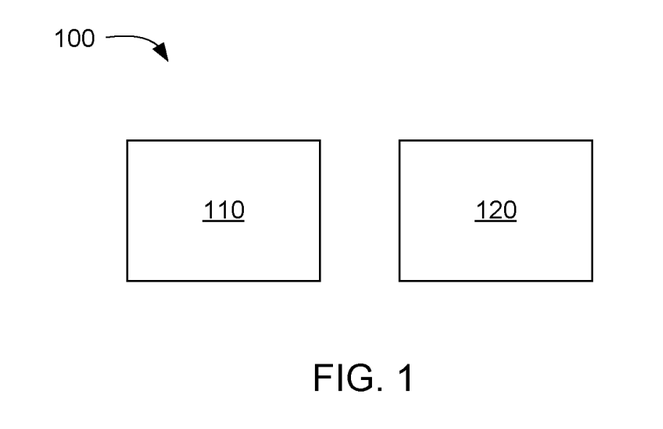
FIG. 1 is a schematic view of an example multi-fluid kit for three-dimensional printing in accordance with examples of the present disclosure.

With this description in mind, FIG. 1 shows a schematic of an example multi-fluid kit for three-dimensional printing 100. The kit includes a fusing agent 110 and a chemical functionalization agent 120. The fusing agent can include water and an electromagnetic radiation absorber. The electromagnetic radiation absorber can absorb radiation energy and convert the radiation energy to heat. The chemical functionalization agent can include water and an amine-containing polymer. The amine-containing polymer can be a branched or unbranched polymer including a polymer backbone and multiple pendant side chains. Individual side chains can include —$NH_2$, —NH—, or a combination thereof.

In some examples, the multi-fluid kit can also include a detailing agent. The detailing agent can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

In further examples, the multi-fluid kit can also include a post-processing agent. The post-processing agent can include an amine-reactive compound. The amine-reactive compound can be any compound that reacts with the —NH$_2$ or —NH— of the amine-containing polymer. In some examples, the amine-reactive compound can include a group that attaches to the surface of the three-dimensional printed object through reacting with the —NH$_2$ or —NH— of the amine-containing polymer. For example, the amine-reactive compound can covalently bond to the nitrogen atom in the —NH$_2$ or —NH— groups. In certain examples, the amine-reactive compound can include a functional group such as alkyl halide, alkyl sulfonate, aldehyde, ketone, acid halide, anhydride, sulfonyl chloride, or other functional groups that can react with amino groups. In further examples, the amine-reactive compound can be a dye precursor that covalently attached to the amino groups and forms a colored dye when reacted with the amino groups. In some examples, the amine-reactive compound can be ninhydrin, epichlorohydrin, a pentafluorophenyl ester, or combinations thereof. Specific examples can include ALEXA FLUORO NHS ester dyes (Thermo Fisher Scientific, USA). As an example, ninhydrin can react with an —NH$_2$ group through the following reaction:

In this reaction, the —NH$_2$ group is on a side chain of the amine-containing polymer and the R group represents the remainder of the amine-containing polymer. The ninhydrin molecule reacts by forming a double bond to the nitrogen atom. The nitrogen atom is also still attached to the remainder of the amine-containing polymer. Thus, the ninhydrin molecule becomes attached to the polymer. Because ninhydrin is an amine-reactive dye precursor, the ninhydrin also takes on a visible purple color through this reaction.

When the amine-reactive compound is a dye precursor, the post-processing agent can be applied to a finished three-dimensional printed object to provide highly selective coloring of the surface of the object where the chemical functionalization agent was applied. Areas where the chemical functionalization agent was applied can have amino groups available to react with the dye precursors, whereas the areas without the chemical functionalization agent do not have any amino groups to react with the dye precursors. Thus, the dye precursors can covalently attach to the amino groups and form a colored dye in the areas with the chemical functionalization agent, while other areas of the surface remain uncolored. Additionally, the coloration can be very durable because the dye molecules are covalently attached to the surface of the object.

Figure 2:
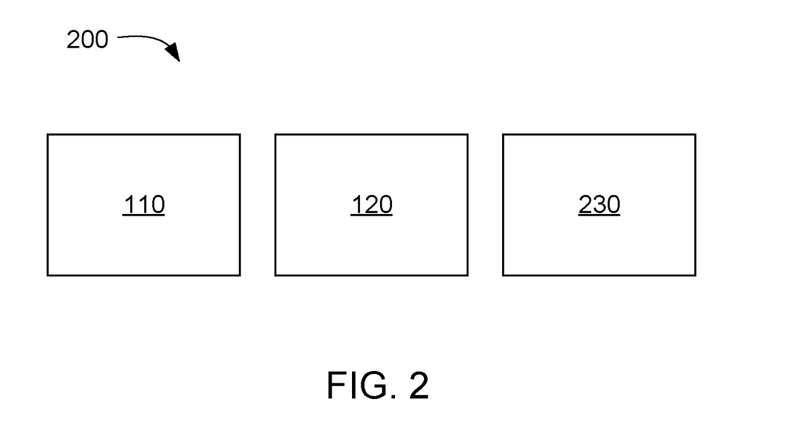
FIG. 2 is a schematic view of another example multi-fluid kit for three-dimensional printing in accordance with examples of the present disclosure.

FIG. 2 shows a schematic illustration of an example multi-fluid kit 200 that includes a fusing agent 110, a chemical functionalization agent 120, and a post-processing agent 230. The post-processing agent can include any amine-reactive compound as described above. In some examples, the post-processing agent can be applied by dipping the three-dimensional printed object in the post processing agent, or by spraying the post-processing agent onto the three-dimensional printed object, or by another method of application such as brushing. In certain examples, the three-dimensional printed object can be washed or rinsed after the post-processing agent is applied.

Three-Dimensional Printing Kits

Figure 3:
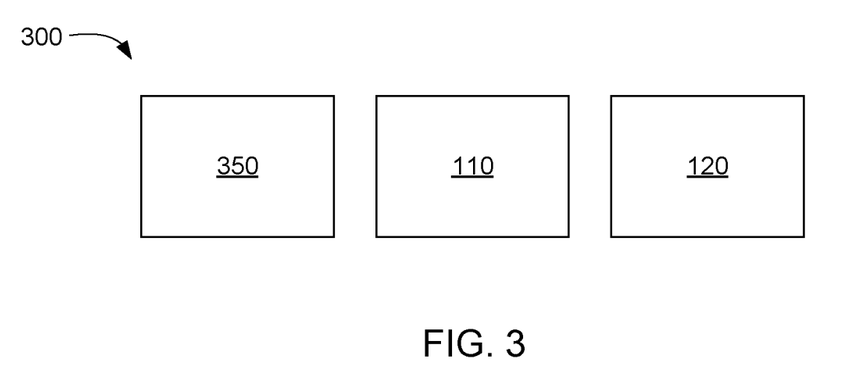
FIG. 3 is a schematic view of an example three-dimensional printing kit in accordance with examples of the present disclosure.

The present disclosure also describes three-dimensional printing kits. In some examples, the three-dimensional printing kits can include materials that can be used in the three-dimensional printing processes described herein. FIG. 3 shows a schematic illustration of one example three-dimensional printing kit 300 in accordance with examples of the present disclosure. The kit includes a powder bed material 350 including polymer particles and a fusing agent 110 to selectively apply to the powder bed material. The fusing agent can include an electromagnetic radiation absorber that can absorb radiation energy and convert the energy to heat. The kit also includes a chemical functionalization agent 120. The chemical functionalization agent can include water and an amine-containing polymer. The amine-containing polymer can be a branched or unbranched polymer that includes a polymer backbone having multiple pendant side chains. Individual side chains can include —NH$_2$, —NH—, or a combination thereof.

Figure 4:
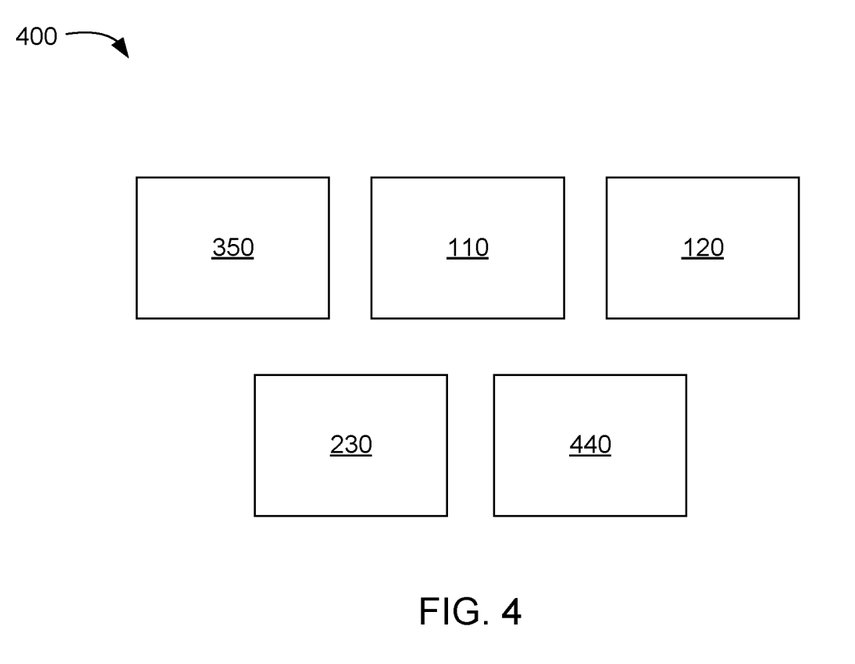
FIG. 4 is a schematic view of another example three-dimensional printing kit in accordance with examples of the present disclosure.

In further examples, a three-dimensional printing kit can include additional fluid agents, such as a detailing agent and/or a post-processing agent. FIG. 4 is a schematic illustration of one example three-dimensional printing kit 400 that includes a powder bed material 350, a fusing agent 110, a chemical functionalization agent 120, a post-processing agent 230, and a detailing agent 440. As mentioned above, the post-processing agent can be used after the final three-dimensional printed object has been formed. For example, the post-processing agent can be sprayed on the three-dimensional printed object or the object can be dipped in the post-processing agent, etc. The detailing agent can be a fluid agent that can be applied during the three-dimensional printing process in areas where it is desired to reduce the temperature of the powder bed.

Figure 5A:
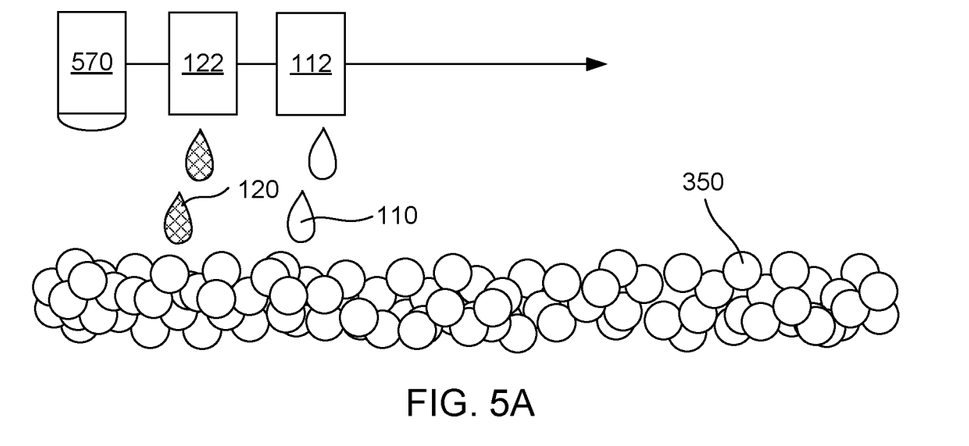
FIGS. 5A-5C show a schematic view of an example three-dimensional printing process using an example three-dimensional printing kit in accordance with examples of the present disclosure.
Figure 5B:
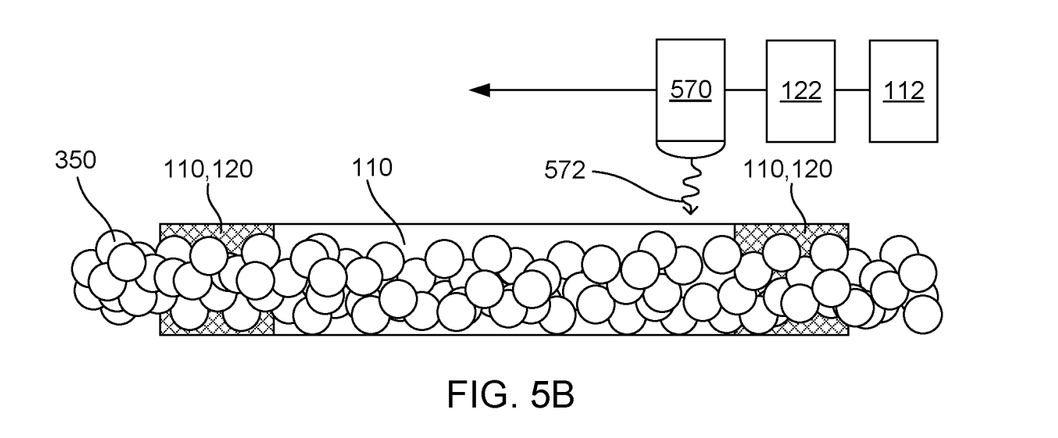
Figure 5C:
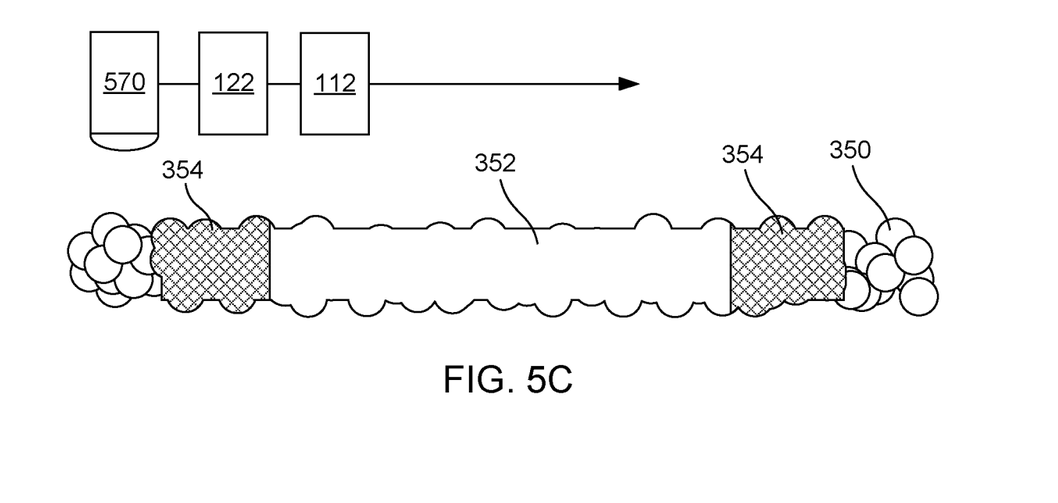

To illustrate the use of the three-dimensional printing kits and multi-fluid kits described herein, FIGS. 5A-5C illustrate one example of using a three-dimensional printing kit to form a three-dimensional printed object. In FIG. 5A, a fusing agent 110 and a chemical functionalization agent 120 are jetted onto a layer of powder bed material 350. The fusing agent is jetted from a fusing agent ejector 112 and the chemical functionalization agent is jetted from a chemical functionalization agent ejector 122. These fluid ejectors can move across the layer of powder bed material to selectively jet fusing agent on areas that are to be fused. The chemical functionalization agent can be jetted in areas where chemical functionalization with —NH$_2$ or —NH— groups is desired. A radiation source 570 can also move across the layer of powder bed material.

FIG. 5B shows the layer of powder bed material 350 after the fusing agent 110 and chemical functionalization agent 120 have been jetted onto an area of the layer that is to be fused. As shown in this figure, the chemical functionalization agent has been jetted in areas at the edges of the layer or slice of the three-dimensional printed object that is being formed from this particular layer of powder bed material. The edges of the layer will become parts of the surface of the finished three-dimensional printed object. The fusing agent has also been jetted in these areas so that these areas of the powder bed will fuse together to become part of the solid three-dimensional printed object. The radiation source 570 is shown emitting radiation 572 toward the layer of polymer particles. The fusing agent can include a radiation absorber that can absorb this radiation and convert the radiation energy to heat.

FIG. 5C shows the layer of powder bed material 350 with a fused portion 352 where the fusing agent was jetted. This portion has reached a sufficient temperature to fuse the polymer particles together to form a solid polymer matrix. The amine-containing polymer from the chemical functionalization agent is incorporated into the solid polymer matrix in the areas at the edges of the layer. Therefore, the fused portion includes a chemically functionalized portion 354.

In many examples, the chemical functionalization agent can be applied to areas of the powder bed where the fusing agent is also applied. As mentioned above, the chemical functionalization agent can be applied at edges of the area where the fusing agent is applied. The edges of the individual fused layers eventually become the surface of the final three-dimensional printed object. Thus, the chemical functionalization agent can be applied to the portions of the powder bed that eventually become the surfaces of the three-dimensional printed object. The chemical functionalization agent can also be applied to a certain area within the edges. For example, the agent can be applied to an area beginning at the edge of the area where the fusing agent is printed, and extending inward from the edge to a certain distance. This will result in the amine-containing polymer being present in the polymer matrix from the surface of the three-dimensional printed object and down to a certain depth beneath the surface. In some examples, the chemical functionalization agent can be applied within the edges to a distance of from about 10 micrometers to about 1 millimeter within the edges. In further examples, this distance can be from about 20 micrometers to about 800 micrometers or from about 50 micrometers to about 500 micrometers.

Additionally, in some examples, the chemical functionalization agent can be applied to the powder bed outside the edges of the area where the fusing agent is applied. In certain examples, the agent can be applied in an area that extends from the edge or border of the area where the fusing agent is applied to a certain distance outside this border. The distance can be from about 10 micrometers to about 1 millimeter, or from about 20 micrometers to about 800 micrometers, or from about 50 micrometers to about 500 micrometers. The polymer particles in this area of the powder may not be fused and incorporated into the three-dimensional printed object. However, it can be difficult to form a perfect edge when fusing the polymer particles and some of the polymer particles near the edge can often become embedded in the surface of the three-dimensional printed object. Therefore, the chemical functionalization agent can be applied to the neighboring polymer particles to ensure that the polymer at the surface of the three-dimensional printed object has the desired amount of the amine-containing polymer present.

Powder Bed Material

In certain examples, the powder bed material can include polymer particles having a variety of shapes, such as substantially spherical particles or irregularly-shaped particles. In some examples, the polymer powder can be capable of being formed into three-dimensional printed objects with a resolution of about 20 µm to about 100 µm, about 30 µm to about 90 µm, or about 40 µm to about 80 µm. As used herein, "resolution" refers to the size of the smallest feature that can be formed on a three-dimensional printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6/6 powder, polyamide 6/12 powder, thermoplastic polyamide powder, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate, polyether ketone powder, polyacrylate powder, polystyrene powder, polyvinylidene fluoride powder, polyvinylidene fluoride copolymer powder, poly(vinylidene fluoride-trifluoroethylene) powder, poly(vinylidene fluoride-trifluoroethylene-chlorotrifluoroethylene) powder, or mixtures thereof. In a specific example, the polymer powder can be polyamide 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the polymer build material. The fusing agent can include a radiation absorber that can absorb radiant energy and convert the energy to heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet print head. Fluid jet print heads can jet the fusing agent in a similar way to an inkjet print head jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

In still other examples, the radiation absorber can be selected to provide that the fusing agent is a "low tint fusing agent" that may be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In alternative examples, the radiation absorber can preferentially absorb ultraviolet radiation. In some examples, the radiation absorber can absorb radiation in wavelength range from about 300 nm to about 400 nm. In certain examples, the amount of electromagnetic energy absorbed by the fusing agent can be quantified as follows: a layer of the fusing agent having a thickness of 0.5 µm after liquid components have been removed can absorb from 90% to 100% of radiant electromagnetic energy having a wavelength within a wavelength range from about 300 nm to about 400 nm. The radiation absorber may also absorb little or no visible light, thus making the radiation absorber transparent to visible light. In certain examples, the 0.5 µm layer of the fusing agent can absorb from 0% to 20% of radiant electromagnetic energy in a wavelength range from above about 400 nm to about 700 nm. Non-limiting examples of ultraviolet absorbing radiation absorbers can include nanoparticles of titanium dioxide, zinc oxide, cerium oxide, indium tin oxide, or a combination thereof. In some examples, the nanoparticles can have an average particle size from about 2 nm to about 300 nm, from about 10 nm to about 100 nm, or from about 10 nm to about 60 nm.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

In certain further examples, the fusing agent can include from about 5 wt % to about 40 wt % organic co-solvent, from about 0 wt % to about 20 wt % high boiling point solvent, from about 0.1 wt % to about 1 wt % surfactant, from about 0.1 wt % to about 1 wt % anti-kogation agent, from about 0.01 wt % to about 1 wt % chelating agent, from about 0.01 wt % to about 1 wt % biocide, and from about 1 wt % to about 10 wt % carbon black pigment. The balance can be deionized water.

Chemical Functionalization Agents

A chemical functionalization agent can be included in the multi-fluid kits, three-dimensional printing kits, and methods described herein. This agent can be a fluid agent that is selectively applied to the powder bed, similar to the fusing agent described above. The chemical functionalization agent can include water and an amine-containing polymer. By applying this agent to the powder bed during three-dimensional printing, the amine-containing polymer can be incorporated into the fused polymer matrix making up the three-dimensional printed object. In certain examples, the chemical functionalization agent can be applied to areas of the powder bed that will become part of the surface of the three-dimensional printed object. Thus, the amine-containing polymer can be present at certain areas of the surface. The amino groups of the amine-containing polymer can be available at the surface to react or interact with other compounds. In this way, certain portions of the surface of the three-dimensional printed object can be chemically functionalized with amino groups.

In particular, in some examples the amine-containing polymer can by a branched or unbranched polymer that includes a polymer backbone and multiple pendant side chains, where the side chains include —$NH_2$, —NH—, or a combination thereof. The —$NH_2$ and —NH— groups can be particularly readily available for reaction when they are present on side chains of the polymer. Amine-containing polymers with a wide variety of degree of branching and number of side chains can be used.

Although many different amine-containing polymers can be used, specific examples of amine-containing polymers can include polyethyleneimine and poly(2-aminoethyl methacrylate). These polymers can be made with a variety of degrees and branching and molecular weights. One example of a polyethyleneimine that can be used is shown below:

This polyethyleneimine polymer has multiple side chains that include —$NH_2$ and —NH— groups. These functional groups can be available for reaction with amine-reactive compounds in a post-processing agent.

The amine-containing polymer can be prepared with a variety of molecular weights. In some examples, the amine-containing polymer can have a weight average molecular weight from about 100 Mw to about 10,000 Mw. In further examples, the weight average molecular weight can be from about 200 Mw to about 6,000 or from about 500 Mw to about 2,000 Mw.

The amount of amine-containing polymer in the chemical functionalization agent can also vary. The total amount of amine-containing polymer that is applied to the powder bed can be controlled by varying the concentration of amine-containing polymer in the chemical functionalization agent and/or by varying the amount of chemical functionalization agent applied to the powder bed. In some examples, the amount of amine-containing polymer in the chemical functionalization agent can be suitable so that the agent is jettable using fluid jet print heads. In certain examples, the amine-containing polymer can be present in an amount from about 5 wt % to about 20 wt % with respect to the total weight of the chemical functionalization agent. In further examples, the amine-containing polymer can be present in an amount from about 6 wt % to about 15 wt % or from about 8 wt % to about 12 wt %.

The chemical functionalization agent can also include ingredients to allow the chemical functionalization agent to be jetted by a fluid jet print head. In some examples, the agent can include jettability imparting ingredients such as those in the fusing agent described above. These ingredients can include a surfactant, dispersant, co-solvent, biocides, viscosity modifiers, materials for pH adjustment, sequestering agents, preservatives, and so on. These ingredients can be included in any of the amounts described above.

In certain examples, the chemical functionalization agent can include water and an organic co-solvent. In some examples, the amount of organic co-solvent in the chemical functionalization agent can be from about 2 wt % to about 10 wt %, or from about 2 wt % to about 8 wt %, or from about 3 wt % to about 6 wt % with respect to the total weight of the chemical functionalization agent.

In certain examples, the chemical functionalization agent can include from about 5 wt % to about 20 wt % amine-containing polymer, from about 2 wt % to about 10 wt % organic co-solvent, from about 0.1 wt % to about 2 wt % surfactant, from about 0.05 wt % to about 5 wt % anti-kogation agent, from about 0.01 wt % to about 5 wt % chelating agent, from about 0.01 wt % to about 4 wt % biocide, and the balance can be deionized water.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet print head. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In certain examples, the detailing agent can include from about 1 wt % to about 10 wt % organic co-solvent, from about 1 wt % to about 20 wt % high boiling point solvent, from about 0.1 wt % to about 2 wt % surfactant, from about 0.1 wt % to about 5 wt % anti-kogation agent, from about 0.01 wt % to about 5 wt % chelating agent, from about 0.01 wt % to about 4 wt % biocide, and the balance can be deionized water.

Methods of Making Three-dimensional Printed objects

Figure 6:
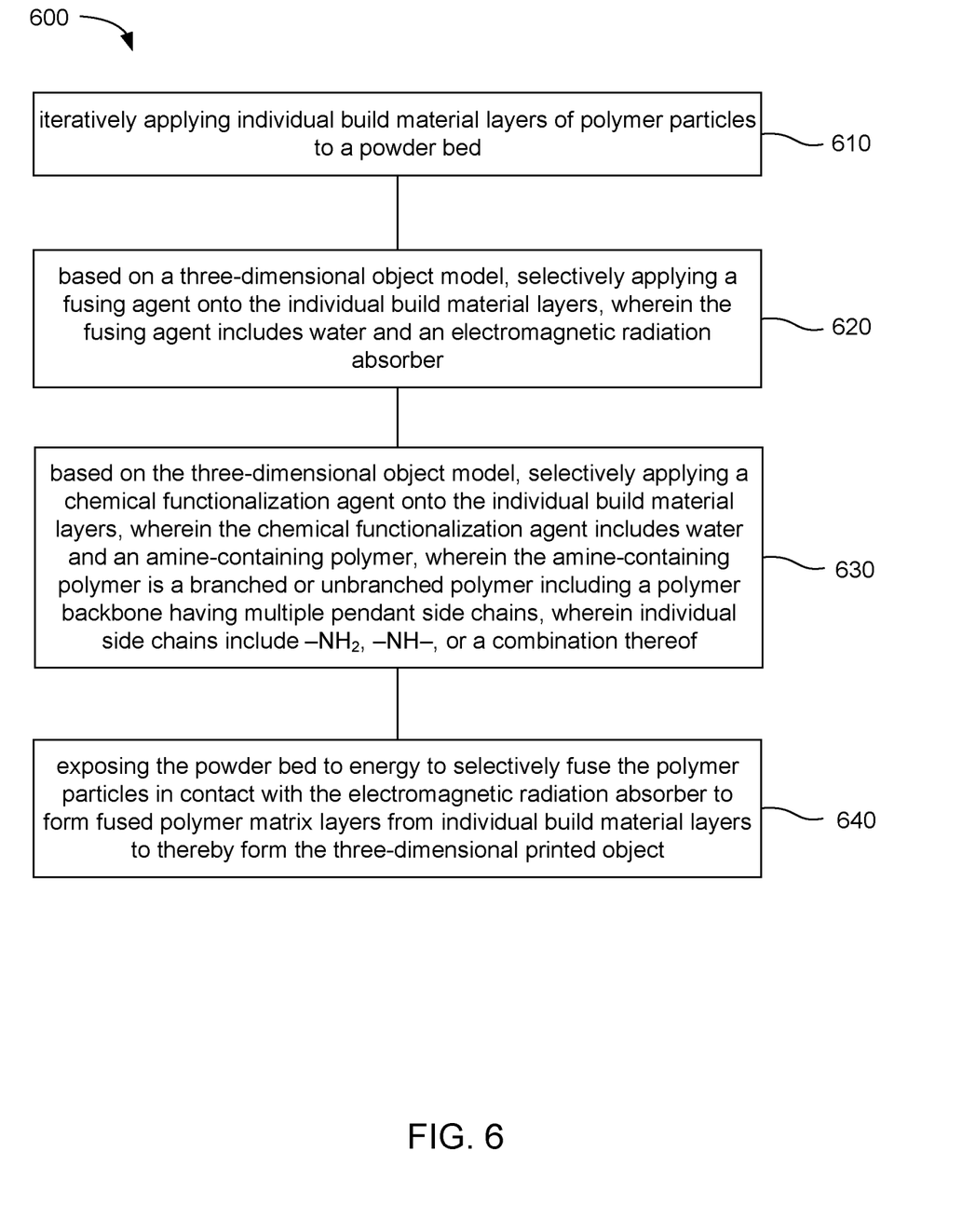
FIG. 6 is a flowchart illustrating an example method of making a three-dimensional printed object in accordance with examples of the present disclosure.

The present disclosure also describes methods of making three-dimensional printed objects. FIG. 6 shows a flowchart illustrating one example method 600 of making a three-dimensional printed object. The method includes: iteratively applying individual build material layers of polymer particles to a powder bed 610; based on a three-dimensional object model, selectively applying a fusing agent onto the individual build material layers, wherein the fusing agent includes water and an electromagnetic radiation absorber 620; based on the three-dimensional object model, selectively applying a chemical functionalization agent onto the individual build material layers, wherein the chemical functionalization agent includes water and an amine-containing polymer, wherein the amine-containing polymer is a branched or unbranched polymer including a polymer backbone having multiple pendant side chains, wherein individual side chains include —$NH_2$, —NH—, or a combination thereof 630; and exposing the powder bed to energy to selectively fuse the polymer particles in contact with the electromagnetic radiation absorber to form fused polymer matrix layers from individual build material layers to thereby form the three-dimensional printed object 640.

The method of making a three-dimensional printed object can be performed using any of the fluid agents, powder bed materials, and other components of the multi-fluid kits and three-dimensional printing kits described above. In some examples, applying individual build material layers can be repeated multiple times to form multiple layers or slices of the three-dimensional printed object. The fusing agent and chemical functionalization agent can be applied to the individual layers as desired. The areas where the chemical functionalization agent is applied can become portions of the surface that are functionalized with —$NH_2$, —NH—, or a combination thereof in the finished three-dimensional printed object. In these portions of the surface, the amine-containing polymer from the chemical functionalization agent can be incorporated into the fused polymer matrix formed by fusing together the polymer particles in the powder bed.

In some examples, the surface of the final three-dimensional printed object can have a pattern of chemically functionalized areas and unfunctionalized areas. Applying the chemical functionalization agent using precise methods such as fluid jetting can allow for voxel-level control over the placement of the chemical functionalization agent. Therefore, high resolution patterns of chemically functionalized areas can be formed on the surface of the three-dimensional printed object. The areas where the chemical functionalization agent is applied can have —$NH_2$ groups, —NH— groups, or a combination thereof, and the other areas of the surface can have no —$NH_2$ or —NH— groups.

The methods of making a three-dimensional printed object can also include an amine-reactive compound as described above. In some examples, the amine-reactive compound can react with the —$NH_2$ groups or —NH— groups by attaching to the —$NH_2$ groups or —NH— groups. In particular examples, the amine-reactive compound can attach covalently to the nitrogen atom of the —$NH_2$ groups or —NH— groups. The amine-reactive compound can attach to the surface in this way in the areas where the chemical functionalization agent was applied. In contrast, the amine-reactive compound may not attach to the surface in the areas where the chemical functionalization agent was not applied. As explained above, in some examples the amine-reactive compound can be a dye precursor that can react to become a colored dye attached to the surface. In such examples, the areas where the chemical functionalization agent was applied can be selectively colored with the colored dye while the other areas of the surface can remain uncolored.

In certain examples, the post-processing agent can be an aqueous solution of the amine-reactive compound, or a dispersion or emulsion of the amine-reactive compound, or a solution of the amine-reactive compound in an organic solvent. The post-processing solution can be applied by dipping, spraying, or another application method.

In further examples, the three-dimensional printing process can be performed using a colorless or low tint fusing agent. Thus, the fusing agent itself can have a minimal effect on the color of the three-dimensional printed object. Therefore, the color of the object can be due to the use of a post processing agent with dye precursors that can react with the —$NH_2$ groups or —NH— groups on the surface to selectively color the chemically functionalized areas of the surface.

The fusing agent, chemical functionalization agent, and detailing agent can be jetted onto the powder bed using fluid jet print heads. The amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be polyamide 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The three-dimensional printed object can be formed by jetting a fusing agent onto layers of powder bed build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. The three-dimensional object model can define the three-dimensional shape of the object. In some examples, the three-dimensional object model can also include a particular three-dimensional portion of the object that is desired to include the amine-containing polymer from the chemical functionalization agent. Other information may also be included, such as structures to be formed of additional different materials or color data for printing the object with various colors at different locations on the object. The three-dimensional object model may also include features or materials specifically related to jetting fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, concentration of the amine-containing polymer, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of build material.

In an example of the three-dimensional printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete three-dimensional object is printed. Thus, "applying individual build material layers of polymer particles to a powder bed" also includes spreading layers of polymer particles over the loose particles and fused layers beneath the new layer of polymer particles.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" includes pigment colorants, magnetic particles, aluminas, silicas, and/or other ceramics, organo-metallics or other opaque particles, whether or not such particulates impart color. Thus, though the present description describes the use of pigment colorants, the term "pigment" can be used to describe pigment colorants, and also other pigments such as organometallics, ferrites, ceramics, etc. In one specific aspect, however, the pigment is a pigment colorant.

As used herein, "applying" when referring to fusing agent and/or detailing agent, for example, refers to any technology that can be used to put or place the respective fluid agent on or into a layer of powder bed material for forming three-dimensional objects. For example, "applying" may refer to "jetting," "ejecting," "dropping," "spraying," or the like.

As used herein, "jetting" or "ejecting" refers to applying fluid agents or other compositions by expelling from ejection or jetting architecture, such as ink-jet architecture. Ink-jet architecture can include thermal or piezo architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are individually identified as separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1

Chemical Functionalization Agent

A sample chemical functionalization agent was made with the composition shown in Table 1.

TABLE 1

| Ingredient | Wt % |
| --- | --- |
| Polyethyleneimine (600 g/mol, amine-containing polymer) | 10 |
| Co-solvent | 4 |
| Surfactant | 0.85 |
| Chelating Agent | 0.02 |
| Biocide | 0.32 |
| Anti-kogation | 0.1 |
| Solvent | balance |

Example 2

Two-Dimensional Print Test

The sample chemical functionalization agent from Example 1 was loaded in a two-dimensional inkjet printer to test the jettability of the agent. A small amount of magenta dye was added to the chemical functionalization agent for this test to allow the agent to be visible when printed on white paper. A test pattern was printed on white paper. The test pattern printed successfully, demonstrating that the agent had acceptable jettability.

Example 3

Three-Dimensional Printed Object

A sample three-dimensional printed object was made using an HP MULTI-JET FUSION 3D® test printer (HP, Inc, USA). The powder bed material was polyamide 12 polymer particles. The fusing agent used for printing was a low tint fusing agent with a very light bluish gray color. The sample chemical functionalization agent from Example 1 was also loaded in a fluid jet pen of the test printer.

The test printer was used to make a series of small cubes. One set of cubes was printed with the low tint fusing agent and the chemical functionalization agent was applied to areas of the powder bed that became the surface of the final cube. A second set of cubes was printed using the low tint fusing agent, but without the chemical functionalization agent. After printing, both sets of cubes were dipped in a post processing agent that was an aqueous solution of ninhydrin. After being dipped, the cubes were allowed to dry for one hour.

At the end of the drying time, the cubes that included the chemical functionalization agent had a very deep purple color due to the reaction of ninhydrin with the amine-containing polymer. The second set of cubes had a slight purple tint, not as deep in color as the cubes with the chemical functionalization agent. Without being bound to a specific mechanism, the slight purple tint may be due to byproducts of pyrrolidone solvents, unknown supplier additives that contain amines, or the presence of amine end groups in the polyamide 12 polymer. It is expected that the slight purple tint can be eliminated by adjusting the materials in the powder bed and fluid agents.

The results show that the chemical functionalization agent can be jetted during three-dimensional printing to make areas of the surface of the three-dimensional object react with amine-reactive compounds. The results also show that ninhydrin be applied in a post processing agent to selectively color the areas where the amine-containing polymer is present.

What is claimed is:

1. A multi-fluid kit for three-dimensional printing, comprising:
   a fusing agent comprising water and an electromagnetic radiation absorber, wherein the electromagnetic radiation absorber absorbs radiation energy and converts the radiation energy to heat;
   a chemical functionalization agent comprising water and an amine-containing polymer, wherein the amine-containing polymer is a branched or unbranched polymer comprising a polymer backbone and multiple pendant side chains, wherein individual side chains comprise —$NH_2$, —NH—, or a combination thereof; and
   a coloring agent comprising an amine-reactive compound to react with the —$NH_2$ or —NH— of the amine-containing polymer.

2. The multi-fluid kit of claim 1, wherein the amine-containing polymer has a weight average molecular weight from about 100 Mw to about 10,000 Mw.

3. The multi-fluid kit of claim 1, wherein the amine-containing polymer is polyethyleneimine or poly(2-aminoethyl methacrylate).

4. The multi-fluid kit of claim 1, wherein the amine-containing polymer is present in an amount ranging from about 5 wt % to about 20 wt %, with respect to a total weight of the chemical functionalization agent.

5. The multi-fluid kit of claim 1, wherein the chemical functionalization agent further includes from about 2 wt % to about 10 wt % of an organic co-solvent, based on a total weight of the chemical functionalization agent.

6. The multi-fluid kit of claim 1, wherein the amine-reactive compound is a dye precursor to covalently attach to the —$NH_2$ or —NH— to form a colored dye.

7. A three-dimensional printing kit, comprising:
   a powder bed material comprising polymer particles;
   a fusing agent to selectively apply to the powder bed material, the fusing agent comprising water and an electromagnetic radiation absorber, wherein the electromagnetic radiation absorber absorbs radiation energy and converts the radiation energy to heat;
   a chemical functionalization agent to selectively apply to the powder bed material, the chemical functionalization agent comprising water and an amine-containing polymer, wherein the amine-containing polymer is a branched or unbranched polymer comprising a polymer backbone having multiple pendant side chains, wherein individual side chains comprise —$NH_2$, —NH—, or a combination thereof; and
   a coloring agent comprising an amine-reactive compound to react with the —$NH_2$ or —NH— of the amine-containing polymer.

8. The three-dimensional printing kit of claim 7, wherein the amine-containing polymer is polyethyleneimine or poly (2-aminoethyl methacrylate).

9. The three-dimensional printing kit of claim 7, wherein the chemical functionalization agent comprises from about 5 wt % to about 20 wt % of the amine-containing polymer, and from about 2 wt % to about 10 wt % of an organic co-solvent.

10. A method of making a three-dimensional printed object, the method comprising:
   iteratively applying individual build material layers of polymer particles to a powder bed;
   based on a three-dimensional object model, selectively applying a fusing agent onto the individual build material layers, wherein the fusing agent comprises water and an electromagnetic radiation absorber;
   based on the three-dimensional object model, selectively applying a chemical functionalization agent onto the individual build material layers, wherein the chemical functionalization agent comprises water and an amine-containing polymer, wherein the amine-containing polymer is a branched or unbranched polymer comprising a polymer backbone having multiple pendant side chains, wherein individual side chains comprise —$NH_2$, —NH—, or a combination thereof;
   exposing the powder bed to energy to selectively fuse the polymer particles in contact with the electromagnetic radiation absorber to form fused polymer matrix layers from individual build material layers to thereby form the three-dimensional printed object, wherein the three-dimensional printed object includes a first surface portion comprising —$NH_2$, —NH—, or a combination thereof and a second surface portion without the —$NH_2$, —NH—, or the combination thereof; and
   applying a coloring agent comprising an amine-reactive compound to the three-dimensional printed object such that the amine-reactive compound attaches to the —$NH_2$, —NH—, or the combination thereof in the first surface portion.

11. The method of claim 10, wherein the amine-reactive compound is a dye precursor that covalently attaches to the —$NH_2$, —NH—, or the combination thereof to form a colored dye, such that the first surface portion becomes colored while the second surface portion remains uncolored.

* * * * *